US012576587B2

(12) United States Patent
Bargen et al.

(10) Patent No.: US 12,576,587 B2
(45) Date of Patent: Mar. 17, 2026

(54) 3D PRINTER FOR AUTOMATED SERIES PRODUCTION

(71) Applicant: Robert Bosch GmbH, Stuttgart (DE)

(72) Inventors: Hans Bargen, Korntal-Muenchingen (DE); Hendrik Jahnle, Leutenbach (DE)

(73) Assignee: Robert Bosch GmbH, Stuttgart (DE)

( * ) Notice: Subject to any disclaimer, the term of this patent is extended or adjusted under 35 U.S.C. 154(b) by 397 days.

(21) Appl. No.: 18/013,500

(22) PCT Filed: Jun. 23, 2021

(86) PCT No.: PCT/EP2021/067072
§ 371 (c)(1),
(2) Date: Dec. 28, 2022

(87) PCT Pub. No.: WO2022/002705
PCT Pub. Date: Jan. 6, 2022

(65) Prior Publication Data
US 2023/0339180 A1 Oct. 26, 2023

(30) Foreign Application Priority Data

Jun. 30, 2020 (DE) ..................... 10 2020 208 174.3

(51) Int. Cl.
*B29C 64/25* (2017.01)
*B29C 64/245* (2017.01)
*B33Y 30/00* (2015.01)

(52) U.S. Cl.
CPC ............ *B29C 64/25* (2017.08); *B29C 64/245* (2017.08); *B33Y 30/00* (2014.12)

(58) Field of Classification Search
CPC ...................................................... B29C 64/25
See application file for complete search history.

(56) References Cited

U.S. PATENT DOCUMENTS

| | | | | |
|---|---|---|---|---|
| 156,425 | A | * | 11/1874 | Langlands .......... E05B 65/0811 70/99 |
| 427,233 | A | * | 5/1890 | Harrison ................. E05C 19/14 220/325 |

(Continued)

FOREIGN PATENT DOCUMENTS

| | | |
|---|---|---|
| CN | 107877863 A | 4/2018 |
| DE | 102015218375 A1 | 3/2017 |

(Continued)

OTHER PUBLICATIONS

Translation of International Search Report for Application No. PCT/EP2021/067072 dated Sep. 29, 2021 (2 pages).

*Primary Examiner* — Timothy Kennedy
(74) *Attorney, Agent, or Firm* — Michael Best & Friedrich LLP

(57) ABSTRACT

The invention relates to a 3D printer (1) comprising a temperature-controllable, thermally insulated assembly space (2) for an object (3) to be produced, and at least one print head (4a, 4b) which is movable along at least two axes (x, y) and can add a powdered, pasty, or liquid material locally to the object (3) to be produced; the thermal insulation of the assembly space (2) comprises a cover (6, 6a-6c) which is in at least two parts and is movable with the print head (4a, 4b); at least a first part (6a) of this cover (6) is fixedly coupled to the movement of the print head along the two axes (x, y), and at least a second part (6b) of this cover (6) can be coupled to the first part (6a) by means of at least one releasable coupling means (7a, 7b).

7 Claims, 4 Drawing Sheets

(56)                    References Cited

U.S. PATENT DOCUMENTS

| | | | | | |
|---|---|---|---|---|---|
| 484,235 | A | * | 10/1892 | Plunkett .................. | E05C 19/14 |
| | | | | | 292/DIG. 20 |
| 824,590 | A | * | 6/1906 | Salviolo .............. | E05B 65/5238 |
| | | | | | 70/70 |
| 2,167,594 | A | * | 7/1939 | Stratman ................. | E05B 63/22 |
| | | | | | 292/196 |
| 2,605,123 | A | * | 7/1952 | Claud-Mantle ......... | E05C 19/14 |
| | | | | | 292/113 |
| 3,110,533 | A | * | 11/1963 | Le Bron ............... | A47B 69/00 |
| | | | | | 312/297 |
| 3,134,617 | A | * | 5/1964 | Slonneger .............. | E05C 19/14 |
| | | | | | 292/113 |
| 3,402,578 | A | * | 9/1968 | Atkinson ........... | E05B 65/5253 |
| | | | | | 292/199 |
| 3,440,844 | A | * | 4/1969 | Constable .......... | E05B 65/5238 |
| | | | | | 70/70 |
| 3,519,298 | A | * | 7/1970 | Gley ....................... | E05C 19/14 |
| | | | | | 292/108 |
| 2013/0075957 | A1 | * | 3/2013 | Swanson ............... | B33Y 40/20 |
| | | | | | 264/405 |
| 2018/0222115 | A1 | * | 8/2018 | Watanabe ............. | B29C 64/241 |
| 2019/0240904 | A1 | * | 8/2019 | Swanson .............. | B29C 64/227 |

FOREIGN PATENT DOCUMENTS

| | | | |
|---|---|---|---|
| EP | 3202574 | A1 | 8/2017 |
| WO | 2018038749 | A1 | 3/2018 |

* cited by examiner

3D PRINTER FOR AUTOMATED SERIES PRODUCTION

BACKGROUND

The present invention relates to a 3D printer that is specifically orientated to simplified series production of objects.

In additive manufacturing of objects by means of 3D printing, material is successively added to the object to be produced and is hardened on the object. For this purpose, liquid or pasty material can, for example, be applied at an increased temperature from a print head that can be moved relative to the object to be produced, to the object to be produced and can solidify there by cooling. Corresponding print heads for metallic feedstock materials are known from DE 10 2015 218 375 A1, for example.

In these and other 3D printers, it is often provided to keep the object to be produced at a base temperature in a temperature-controllable assembly space during manufacture.

SUMMARY

In the context of the invention, a 3D printer was developed. This 3D printer comprises a temperature-controllable, thermally insulated assembly space for an object to be produced, as well as at least one print head movable along at least two axes. This print head is capable of locally adding a powdered, pasty, or liquid material to the object to be produced.

The material can in particular be connected to the object to be produced by the action of temperature. For example, a material exiting the print head in the liquid hot state may connect to the object to be produced as it cools. However, a powdered or pasty material may, for example, also be connected by means of local action of heat within the assembly space, for example by means of a laser beam, to the object to be produced.

However, a pasty or liquid material may, for example, also be cured on the object to be produced by activating or curing with UV light within the assembly space, with the aid of the temperature in the assembly space.

The thermal insulation of the assembly space comprises a cover that is at least two-part and can be moved with the print head. At least a first part of this cover is fixedly coupled to the movement of the print head along the two axes. At least a second part of this cover can be coupled to the first part by means of at least one releasable coupling means.

It has been found that series production of objects with the 3D printer can be significantly simplified in this way. Automated series production generally requires the removal of a finished object from the 3D printer in an automated manner in order to be able to then begin producing the next object. An assembly space enclosed by thermal insulation on all sides impedes this purpose.

In that the second part of the cover can now be decoupled from the movement of the print head, this second part can be deposited, for example, at a designated parking position for this purpose, and the first part can then be moved away from the second part by the movement of the print head. In this way, an opening through which the produced object can be removed can be created in the assembly space. The first part of the cover can subsequently again be moved toward the second part of the cover, and the assembly space can thus be closed again.

Already existing drive sources of the print head may be used for this purpose. In terms of construction and hardware technology, this can be implemented with less effort than, for example, the configuration of a side wall of the assembly space as a hinged or sliding door.

The ability to operate series production with 3D printing, in turn, allows mass-produced components whose shaping cannot be realized with subtractive material processing (such as turning, milling, or drilling), by casting, or by combining these methods, to be produced by means of 3D printing. Thus, the group of objects that can feasibly be manufactured in series production is expanded by objects that, based on their shape, can only be feasibly produced by means of 3D printing. These can, for example, in particular be objects whose shape according to an optimization algorithm or according to an analytical calculation has been selected such that a certain function can be fulfilled in the best possible way. On the other hand, for objects that can be produced selectively with 3D printing or with conventional material processing, the conventional material processing is usually faster for series production. However, in this case, first small series for development and testing can also be sensibly produced with 3D printing. In the event that changes to the final shape are still required after testing, no set-up costs for the conventional material processing are then lost.

In the state in which the first part of the cover is coupled to the second part of the cover, the two parts of the cover can in particular engage in one another, for example, adjoin one another, or overlap in the manner of a sliding protection. One of these parts can, for example, also overlap with a further part in the manner of a sliding protection.

In a particularly advantageous embodiment, the first part of the cover and the second part of the cover, in the state in which these parts are coupled to one another, define a passage into the assembly space. The print head can be guided through this passage into the assembly space. In particular, a heater of the print head can then be located within the assembly space, for example. The heat generated by the print head can then largely be retained in the assembly space.

In a further particularly advantageous embodiment, the 3D printer furthermore comprises a base plate, arranged within the assembly space, for receiving the object to be produced. This base plate can be moved at least along one axis that is linearly independent of the axes along which the print head can be moved. The base plate may, for example, in particular be movable perpendicularly to the axes along which the print head can be moved.

In a further particularly advantageous embodiment, the 3D printer furthermore comprises a conveying unit capable of removing the produced object and/or the base plate from the assembly space in a state in which the first part of the cover is spaced apart from the second part of the cover. The 3D printer can then produce one object after another without the need for manual intervention. The conveying unit can, for example, be designed as a gripping device or as a robotic arm.

In this case, it is in particular advantageous to grip not the object itself but the base plate. Regardless of which object is produced in the individual case, the base plate can always be gripped in the same manner. This simplifies switching from one object to be produced to a modified or different object within series production.

Furthermore, it is more easily possible outside of the assembly space to mechanically separate a produced object adhering to the base plate from the base plate. In particular, there is then no risk of the 3D printer or its mechanics being damaged by the application of force required to detach the object from the base plate. Furthermore, outside the assembly space, the base plate can be cleaned of material residues so that the production of further objects can then again proceed reproducibly from a clean base plate.

In a particularly advantageous embodiment, at least one releasable coupling means is a latching device that latches when the first part of the cover approaches the second part and unlatches from a predetermined minimum speed when the first part is moved rapidly. The latching device may in particular be dimensioned such that it remains latched as the print head moves at the speeds provided during 3D printing. This in particular facilitates depositing the second part of the cover at a designated parking position and then moving the first part away from the second part.

Opening the assembly space in this manner may furthermore be assisted by a blocking device capable of retaining the second part of the cover at least when said second part is at a designated parking position. This blocking device may also cooperate with other releasable coupling means. Regardless of how the releasable coupling means is designed in detail, a force sufficient for releasing may then be applied to the coupling means via the first part of the cover.

In a further particularly advantageous embodiment, at least one releasable coupling means is a latching connection that latches into the second part when the first part of the cover approaches. An additional actuator is provided that is capable of unlatching the latching connection. In this way, the process of unlatching is more reproducible than with a control only via the force applied to the coupling means. For example, the force necessary for "pulling apart" the coupling means may vary due to tilting or jamming. Furthermore, the full dynamic of the drive source of the print head may be utilized to move the print head as quickly as possible and to complete the object just as quickly.

Particularly advantageously, the actuator is not part of the cover and is capable of unlatching the latching connection precisely when the second part of the cover is at a designated parking position. Then, the actuator does not change position during the movements of the print head, so that it becomes constructively easier to supply it with power and to control it.

For example, the coupling means may comprise a spring-loaded lever on one part of the cover as well as a groove applied to the other part of the cover. This groove may, for example, in particular have perpendicular flanks, and an inclined ramp may lead from outside the groove to at least one such flank. As the two parts of the cover are moved toward one another, the lever may slide on the inclined ramp toward the groove. When the two parts of the cover are arranged in relation to one another precisely such that the cover is nominally closed, the lever is moved across the groove and pressed into the groove by the spring force. Further movement of one part of the cover then results in the lever taking along the perpendicular flank of the groove, or vice versa, so that the other part of the cover is moved along. The lever may then be raised by the actuator in order to again allow a free relative movement between the two parts of the cover.

In a further advantageous embodiment, at least one releasable coupling means comprises at least one permanent magnet or electromagnet on a part of the cover as well as at least one ferromagnetic element on another part of the cover. A permanent-magnetic coupling means can also be released by forceful and/or rapid movement of the first part of the cover and is here completely wear-free, in contrast to a latching connection. An electromagnetic coupling means is even easier to release by switching off the electromagnet.

In a further particularly advantageous embodiment, at least one releasable coupling means comprises at least one elevation on a part of the cover as well as at least one depression, corresponding to said elevation, on another part of the cover. By raising or lowering at least one part of the cover, the elevation can be brought out of engagement with the depression. Such a coupling means also combines secure coupling on the one hand with a wear-free release operation on the other hand.

Further measures improving the invention are described in more detail below on the basis of the figures, together with the description of the preferred exemplary embodiments of the invention.

DETAILED DESCRIPTION

Figure 1:
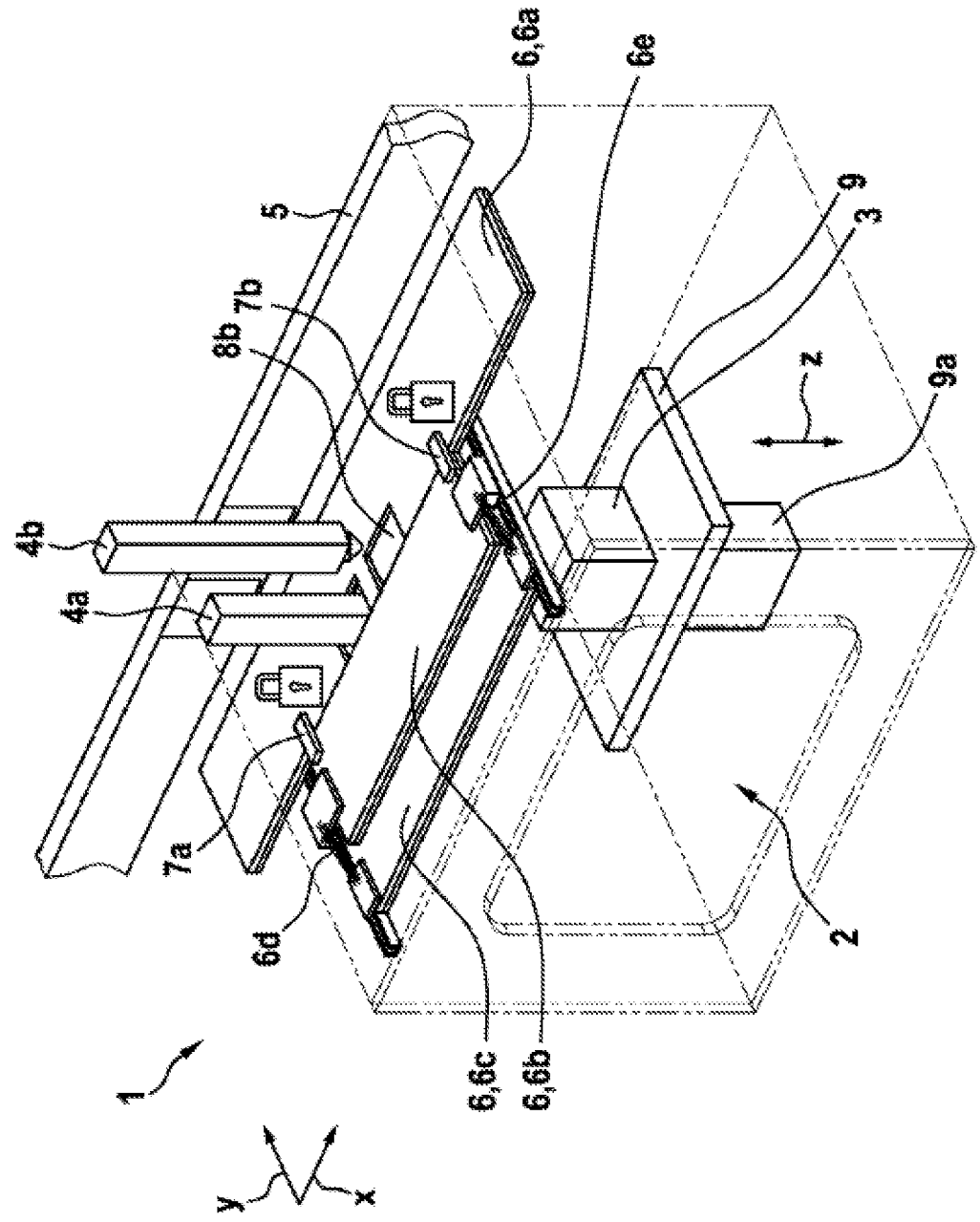
FIG. 1 exemplary embodiment of the 3D printer 1 with the assembly space 2 closed.

FIG. 1 shows an exemplary embodiment of a 3D printer 1. The object 3 is to be produced on a base plate 9 within a thermally insulated assembly space 2. The base plate 9 can be displaced in the direction of the z-axis by a drive 9a. With two print heads 4a and 4b that can be perpendicularly moved to the z-axis along the x-axis and y-axis via a drive system 5, material can be added locally to the object 3 to be produced.

The assembly space 2 is closed upward by a cover 6. Said cover 6 consists of three parts 6a, 6b, and 6c. The first part 6a and the second part 6b abut one another and form two recesses. In the state shown in FIG. 1, the print head 4a, which is currently being used, is guided into the assembly space 2 by the one recess. The other recess is closed by an insulation flap 8b since the print head 4b is currently not being used. The second part 6b of the cover 6 slides in the manner of a sliding protection over the third part 6c when the print head 4a, 4b and the first part 6a of the cover 6 are moved toward the third part 6c. As the print head 4a, 4b and the first part 6a of the cover 6 are moved away from the third part 6c, the second part 6b slides, with the aid of the spring elements 6d, 6e, in the opposite direction over the third part 6c in order to follow the first part 6a.

In the state shown in FIG. 1, the first part 6a and the second part 6b of the cover 6 are coupled to one another via releasable coupling means 7a, 7b.

Figure 2:
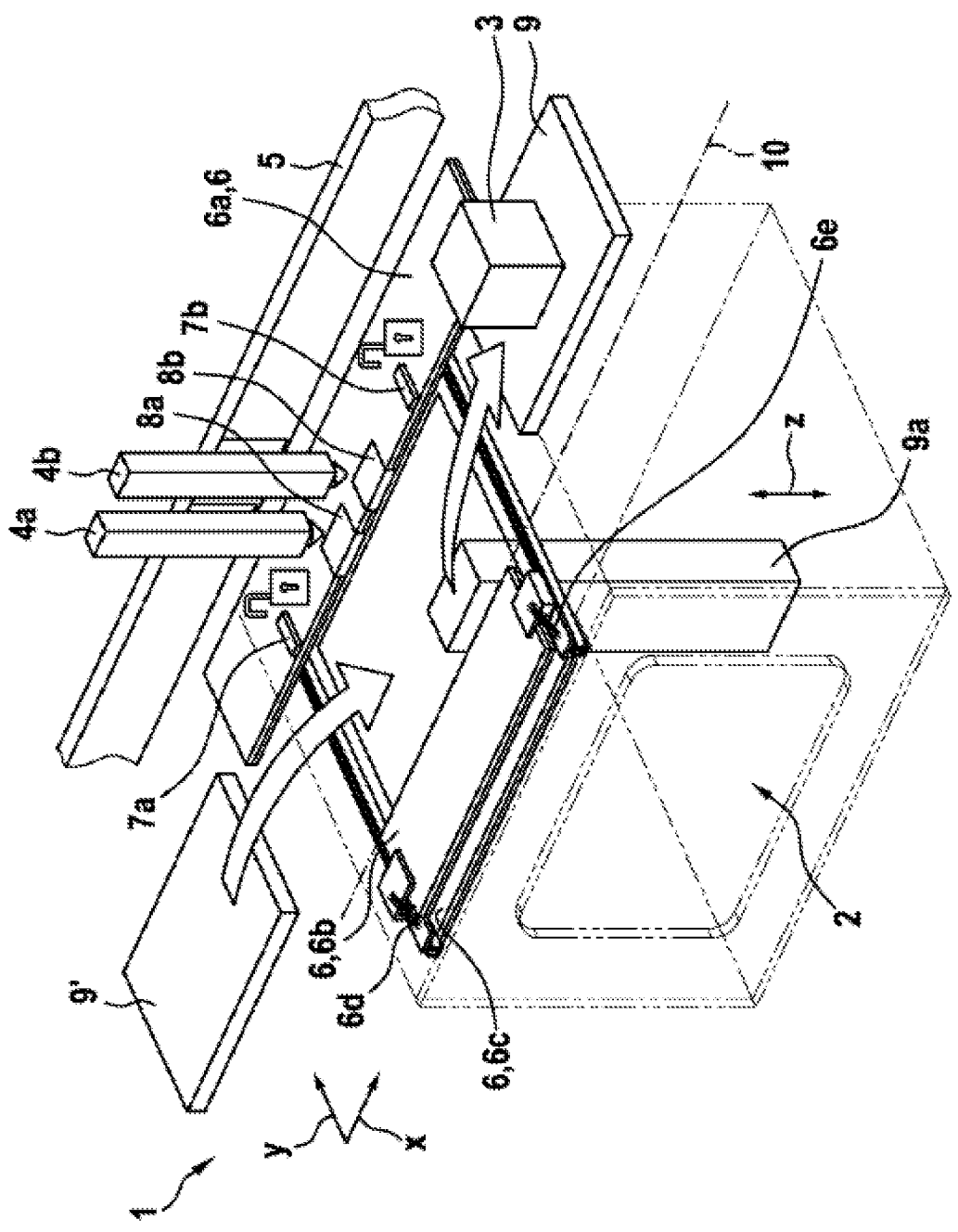
FIG. 2 state of the 3D printer 1 shown in FIG. 1, with the assembly space 2 open.

FIG. 2 shows the state of the 3D printer 1 in which the assembly space 2 is open. For this purpose, the second part 6b of the cover 6 was maximally moved over the third part 6c up to a parking position 10, at which the second part 6b is retained by a blocking device not shown in FIG. 2. Subsequently, the releasable coupling means 7a, 7b were released, and the first part 6a of the cover 6 was moved to its stop in the positive y-direction in order to create a gap as large as possible to the second part 6b.

In this state, both print heads 4*a* and 4*b* are also moved out of the assembly space 2. The recess by which the print head 4*a* was guided into the assembly space 2 in FIG. 1 is therefore now also closed by an insulation flap 8*a*.

Furthermore, the drive 9*a* of the base plate 9 was maximally moved upward in the z-direction. In this position, the base plate 9, together with the object 3 produced thereon, can be removed and replaced by a new base plate 9'. Thereafter, the production of the next object 3 can be started immediately on this new base plate 9' while the previously produced object 3 is removed from the base plate 9 and the base plate 9 is cleaned.

Figure 3:
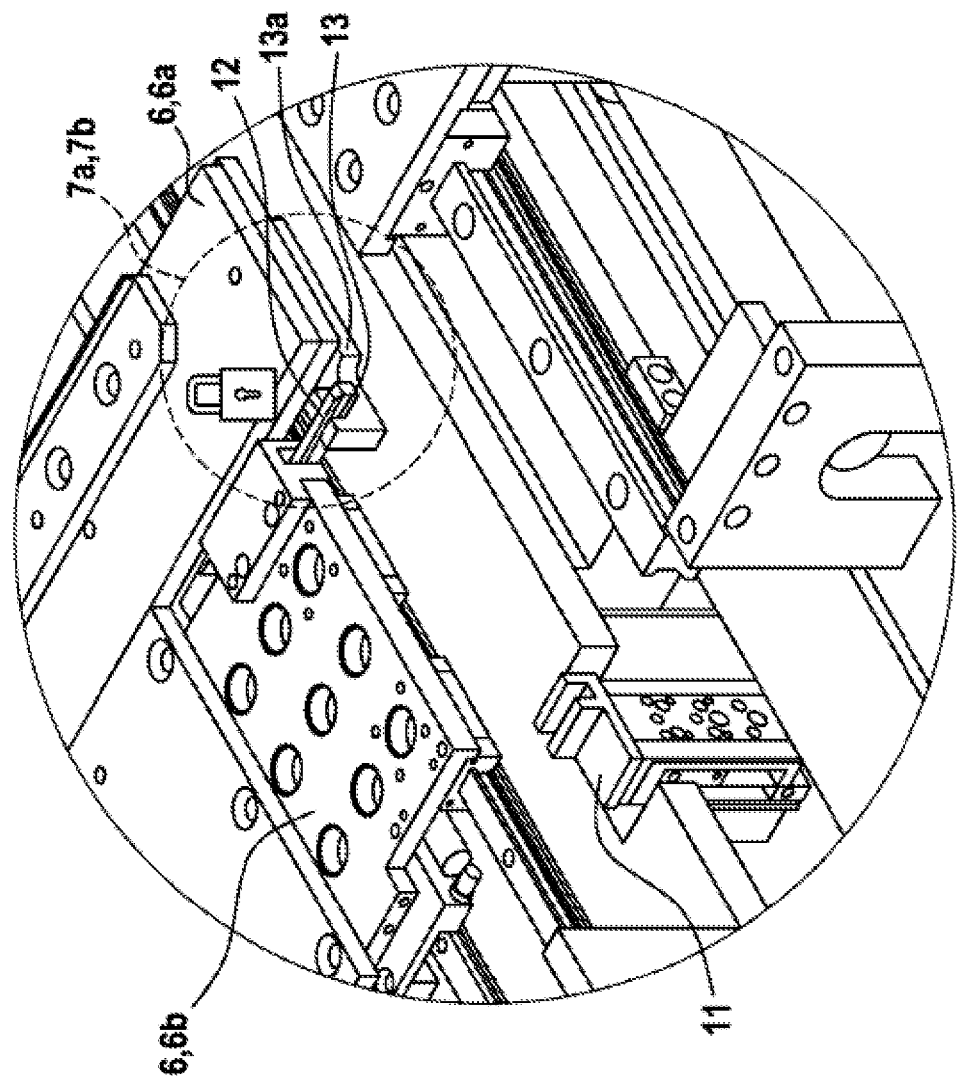
FIG. 3 exemplary embodiment of a releasable coupling means 7a, 7b with lever 12 and actuator 11 for releasing.

FIG. 3 shows an exemplary embodiment of a releasable coupling means 7*a*, 7*b* in the coupled state. The coupling means 7*a*, 7*b* comprises a spring-loaded lever 12 on the second part 6*b* of the cover 6 and a fork 13*a* having a groove 13 on the first part 6*a* of the cover 6. In the state shown in FIG. 3, the lever 12 engages in the groove 13. Thus, when the first part 6*a* of the cover 6 is moved, it takes along the second part 6*a* by means of the fork 13*a* and the lever 12. In order to release the coupling means 7*a*, 7*b*, a separate actuator 11 is provided, which takes part neither in a movement of the first part 6*a* nor in a movement of the second part 6*b* of the cover 6.

Figure 4:
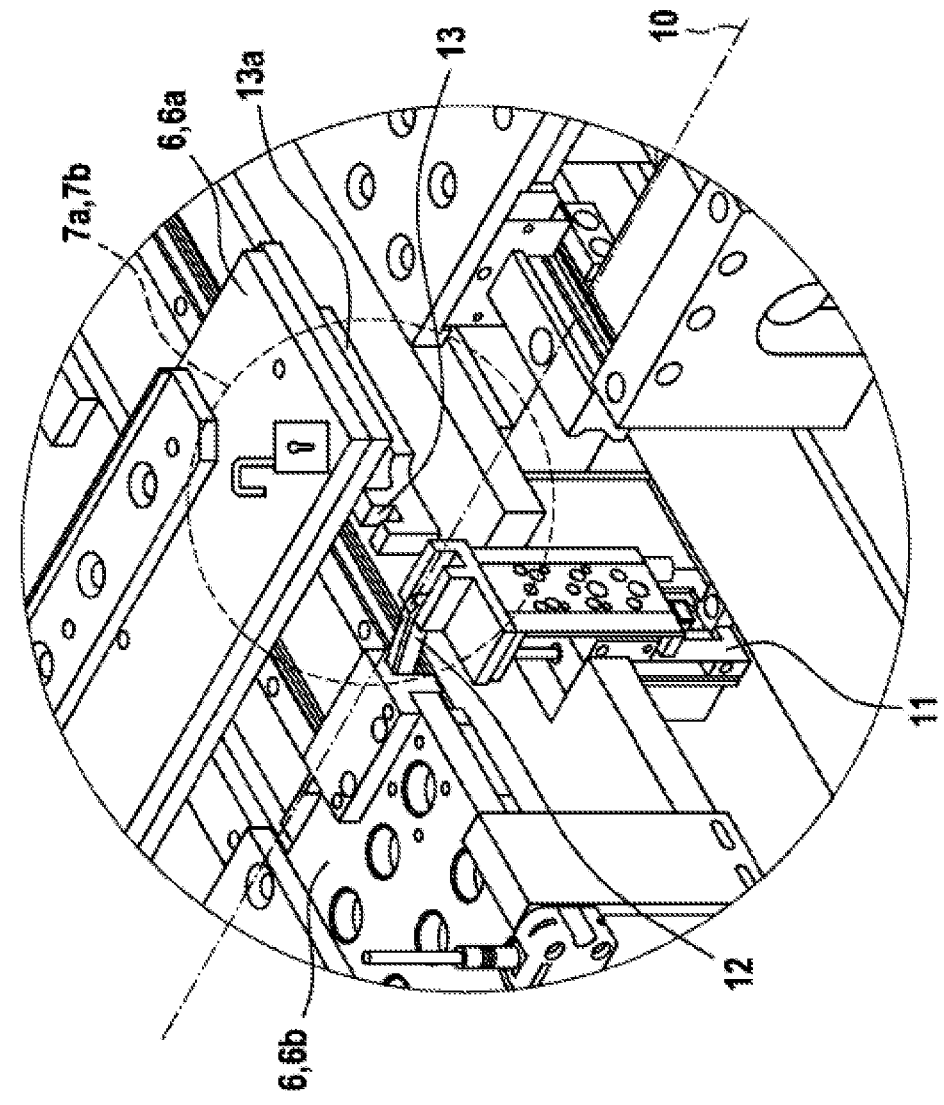
FIG. 4 released state of the coupling means 7a, 7b shown in FIG. 3.

FIG. 4 shows the exemplary embodiment, shown in FIG. 3, of the coupling means 7*a*, 7*b* in the released state. In the state shown in FIG. 4, the second part 6*b* of the cover 6 is at the parking position 10. In comparison to FIG. 3, the actuator 11 is extended upward and has raised the lever 12. As a result, the lever 12 has been moved out of engagement with the groove 13. This in turn made it possible to move the first part 6*a* of the cover 6 away from the second part 6*b* while the second part 6*b* remained at the parking position 10. As indicated in FIG. 4, the actuator 11 can here simultaneously also serve as a blocking device, which holds the second part 6*b* of the cover 6 at the parking position 10.

What is claimed is:

1. A 3D printer (1) comprising a temperature-controllable, thermally insulated assembly space (2) for an object (3) to be produced as well as at least one print head (4*a*, 4*b*) which can be moved along at least two axes (x, y), each of the at least two axes (x, y) being perpendicular to one another, and is capable of adding a powdered, pasty, or liquid material locally to the object (3) to be produced, wherein the assembly space (2) includes an at least two-part cover (6, 6*a*-6*c*) which can be moved with the at least one print head (4*a*, 4*b*), wherein at least a first part (6*a*) of the at least two-part cover (6, 6*a*-6*c*) is fixedly coupled for movement with the at least one print head (4*a*, 4*b*) along the at least two axes (x, y), and wherein at least a second part (6*b*) of the at least two-part cover (6, 6*a*-6*c*) can be coupled to the first part (6*a*) by at least one releasable coupling means (7*a*, 7*b*), wherein the at least one releasable coupling means (7*a*, 7*b*) includes a spring-loaded lever (12) at one part (6*a*, 6*b*) of the at least two-part cover (6, 6*a*-6*c*) and a groove (13) applied to another part (6*a*, 6*b*) of the at least two-part cover (6, 6*a*-6*c*), in such a way that the spring-loaded lever (12) can be moved across the groove (13) during a relative movement of the one part (6*a*, 6*b*) and the another part (6*a*, 6*b*) in relation to one another and can be pressed into the groove (13) by spring force, wherein an actuator (11) is configured to axially move along an axis (z), the axis (z) being perpendicular to each of the at least two axes (x, y), wherein the actuator (11) is configured to unlatch the spring-loaded lever (12) from the groove (13) when the second part (6*b*) is at a designated parking position, and wherein the actuator (11) includes a blocking device that is capable of retaining the second part (6*b*) when the second part (6*b*) is at the designated parking position (10).

2. The 3D printer (1) according to claim 1, wherein the first part (6*a*) of the at least two-part cover (6, 6*a*-6*c*) and the second part (6*b*) of the at least two-part cover (6, 6*a*-6*c*), in a state in which they are coupled to one another, define a passage into the assembly space (2) through which the at least one print head (4*a*, 4*b*) can be guided into the assembly space (2).

3. The 3D printer (1) according to claim 1, further comprising a base plate (9), arranged within the assembly space (2), for receiving the object (3) to be produced, wherein the base plate (9) can be moved at least along the axis (z), wherein the axis (z) is linearly independent of the at least two axes (x, y) along which the at least one print head (4*a*, 4*b*) can be moved.

4. The 3D printer (1) according to claim 3, further comprising a conveying unit capable of removing the object (3) and/or the base plate (9) from the assembly space (2) in a state in which the first part (6*a*) of the at least two-part cover (6, 6*a*-6*c*) is spaced apart from the second part (6*b*) of the at least two-part cover (6, 6*a*-6*c*).

5. The 3D printer (1) according to claim 1, wherein the at least one releasable coupling means (7*a*, 7*b*) is a latching device that latches when the first part (6*a*) of the at least two-part cover (6, 6*a*-6*c*) approaches the second part (6*b*) and unlatches when the first part (6*a*) is moved.

6. The 3D printer (1) according to claim 1, wherein the at least one releasable coupling means (7*a*, 7*b*) is a latching connection that latches when the first part (6*a*) of the at least two-part cover (6, 6*a*-6*c*) approaches the second part (6*b*), wherein the actuator (11) is capable of unlatching the latching connection.

7. The 3D printer (1) according to claim 6, wherein the actuator (11) is not part of the at least two-part cover (6, 6*a*-6*c*) and is capable of unlatching the latching connection precisely when the second part (6*b*) of the at least two-part cover (6, 6*a*-6*c*) is at a designated parking position.

* * * * *